(12) United States Patent
Takagi et al.

(10) Patent No.: US 10,663,643 B2
(45) Date of Patent: May 26, 2020

(54) DISPLAY APPARATUS FOR DISPLAYING SPECIFIC PATTERN, HAS EMISSION STRUCTURE REGION CONTAINING SEVERAL EMISSION STRUCTURE PORTIONS IN WHICH EMISSION LIGHT QUANTITY IN INCIDENT TO PREDETERMINED DIRECTION IS MAXIMUM IN DIRECTION OF LIGHT SOURCE

(71) Applicant: Omron Corporation, Kyoto (JP)

(72) Inventors: Yoshihiko Takagi, Kyoto (JP); Takahiro Morichi, Kyoto (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/342,289

(22) PCT Filed: Nov. 20, 2017

(86) PCT No.: PCT/JP2017/041690
§ 371 (c)(1),
(2) Date: Apr. 16, 2019

(87) PCT Pub. No.: WO2018/168080
PCT Pub. Date: Sep. 20, 2018

(65) Prior Publication Data
US 2019/0257996 A1    Aug. 22, 2019

(30) Foreign Application Priority Data
Mar. 14, 2017  (JP) .................................. 2017-048877

(51) Int. Cl.
*F21V 8/00*    (2006.01)
*G09F 13/18*    (2006.01)
(Continued)

(52) U.S. Cl.
CPC ............... *G02B 6/006* (2013.01); *G02B 6/00* (2013.01); *G02B 6/0036* (2013.01);
(Continued)

(58) Field of Classification Search
CPC ... G02B 6/006; G02B 6/0073; F21Y 2115/10; G09F 2013/1886
See application file for complete search history.

(56) References Cited

U.S. PATENT DOCUMENTS 6,745,506 B2 * 6/2004 Maas .................. G02B 6/0036
                                                 362/604
9,417,378 B2 * 8/2016 Takagi ................... G02B 6/006
(Continued)

FOREIGN PATENT DOCUMENTS

JP    2003-149639 A    5/2003
JP    2003-519810 A    6/2003
(Continued)

OTHER PUBLICATIONS

International Search Report issued in Application No. PCT/JP2017/041690, dated Feb. 6, 2018 (1 page).
(Continued)

*Primary Examiner* — Robert J May (57) ABSTRACT

In a display device (1), a light guide plate (2) includes a first emission structure region including a plurality of first emission structures (6 and 8) in which an incident direction for maximizing an amount of light emitted in a predetermined direction is a direction of a first light source (4), a second emission structure region including a plurality of second emission structures (9 and 10) in which the incident direction for maximizing the amount of light emitted in the predetermined direction is a direction of a second light source adjacent to the first light source, and a third emission structure region including a plurality of third emission
(Continued)

structures (11 to 13) in which the incident direction for maximizing the amount of light emitted in the predetermined direction is a direction between the first light source and the second light source, and the third emission structure region is disposed between the first emission structure region and the second emission structure region.

9 Claims, 4 Drawing Sheets

(51) Int. Cl.
    *G09F 13/20*    (2006.01)
    *G02B 6/00*    (2006.01)
    *G06F 13/00*    (2006.01)

(52) U.S. Cl.
    CPC ........... *G02B 6/0068* (2013.01); *G09F 13/18* (2013.01); *G09F 13/20* (2013.01); *G06F 13/00* (2013.01); *G09F 2013/184* (2013.01)

(56) References Cited

U.S. PATENT DOCUMENTS

| | | | |
|---|---|---|---|
| 10,401,555 B2 * | 9/2019 | Fujita | G09F 13/005 |
| 2003/0046842 A1 | 3/2003 | Maas et al. | |
| 2011/0088292 A1 | 4/2011 | Kay et al. | |
| 2015/0092444 A1 | 4/2015 | Takagi et al. | |
| 2017/0248749 A1 | 8/2017 | Fujita et al. | |

FOREIGN PATENT DOCUMENTS

| | | |
|---|---|---|
| JP | 2007-317479 A | 12/2007 |
| JP | 2015-88489 A | 5/2015 |
| JP | 2016-122162 A | 7/2016 |

OTHER PUBLICATIONS

Written Opinion issued in International Application No. PCT/JP2017/041690, dated Feb. 6, 2018 (10 pages).

Notification of Reasons for Refusal issued in Japanese Application No. 2017-048877, dated Mar. 24, 2020 (13 pages).

* cited by examiner

DISPLAY APPARATUS FOR DISPLAYING SPECIFIC PATTERN, HAS EMISSION STRUCTURE REGION CONTAINING SEVERAL EMISSION STRUCTURE PORTIONS IN WHICH EMISSION LIGHT QUANTITY IN INCIDENT TO PREDETERMINED DIRECTION IS MAXIMUM IN DIRECTION OF LIGHT SOURCE

TECHNICAL FIELD

The present invention relates to a display device that displays a specific symbol by light.

BACKGROUND ART

As an example of a display device that displays a specific symbol by light, Patent Document 1 discloses a display device including a panel of a light transmitting material. In the display device, light having entered the panel from a light source facing a first end face is reflected by each of a plurality of triangular prisms (corresponding to a first optical sign) formed on a rear wall and emitted from a light exit surface to form the first optical sign. Meanwhile, light having entered the panel from the light source facing a second end face is reflected by each of a plurality of triangular prisms (corresponding to a second optical sign) formed on the rear wall and emitted from the light exit surface to form the second optical sign.

PRIOR ART DOCUMENT

Patent Document

Patent Document 1: Japanese Translation of PCT International Application Publication No. 2003-519810 (Published on Jun. 24, 2003).

SUMMARY OF THE INVENTION

Problems to be Solved by the Invention

However, when the first optical sign and the second optical sign are sequentially displayed so that it appears to an observer that the displayed optical sign is moving in the lighting device described in Patent Document 1 above (it is assumed that the first optical sign and the second optical sign have the same shape), the optical sign does not appear to be moving continuously, but each frame of flip animation appears to be displayed sequentially.

One aspect of the present invention has been made in view of the above problem, and an object of one aspect of the present invention is to provide a technique in which a symbol, displayed in a display device that displays a specific symbol by light, appears to an observer to be moving continuously.

Means for Solving the Problem

In order to solve the above problem, a display device according to one aspect of the present invention includes a plurality of light sources and a light guide plate configured to guide light incident from each of the light sources and emit a part of the guided light from a light exit surface. In the display device, the light guide plate includes a first emission structure region including a plurality of first emission structures in which an incident direction for maximizing an amount of light emitted in a predetermined direction is a direction of a first light source, a second emission structure region including a plurality of second emission structures in which the incident direction for maximizing the amount of light emitted in the predetermined direction is a direction of a second light source adjacent to the first light source, and a third emission structure region including a plurality of third emission structures in which the incident direction for maximizing the amount of light emitted in the predetermined direction is a direction between the first light source and the second light source. The third emission structure region is disposed between the first emission structure region and the second emission structure region.

Effect of the Invention

According to one aspect of the present invention, in a display device that displays a specific symbol by light, the displayed symbol appears to the observer to be moving continuously.

MODE FOR CARRYING OUT THE INVENTION

Hereinafter, an embodiment of the present invention will be described in detail. However, the configuration described in the present embodiment is not intended to limit the scope of the present invention to what will be described below unless otherwise specified, but is merely an explanatory example.

Configuration of Display Device 1

Figure 1:
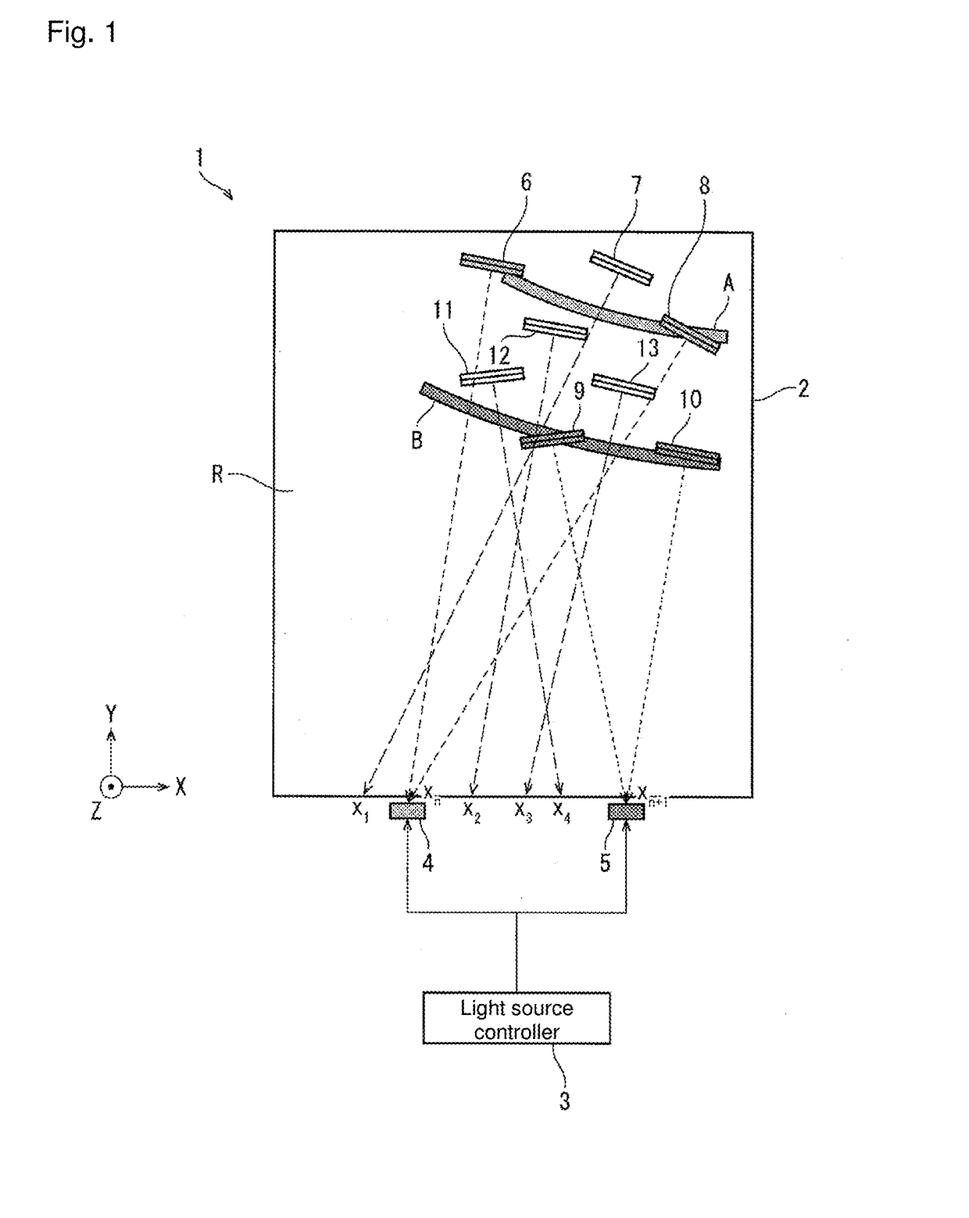
FIG. 1 is a schematic view illustrating a configuration of a display device according to an embodiment of the present invention.
Figure 2:
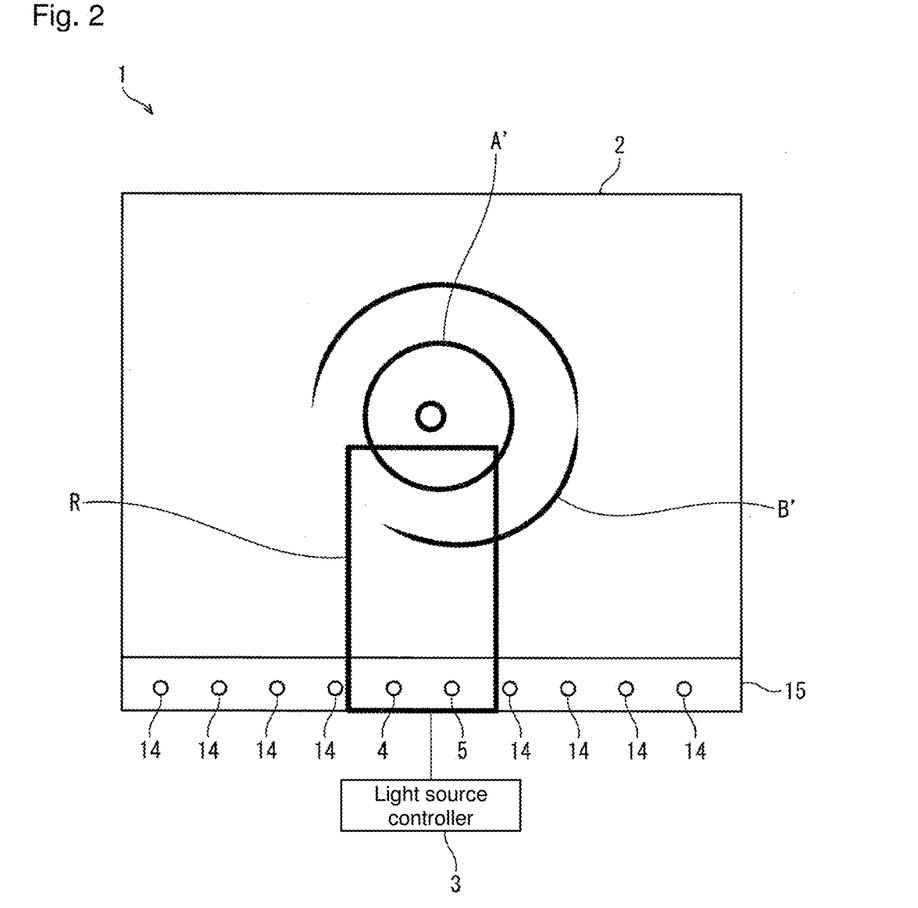
FIG. 2 is a schematic view illustrating an appearance of the display device according to the embodiment of the present invention.

The display device 1 according to the present embodiment will be described in detail with reference to FIGS. 1 and 2. FIG. 1 is a schematic view illustrating the outline of the configuration of the display device 1 according to the present embodiment. FIG. 2 is a schematic view illustrating the appearance of the display device 1. Note that the light guide plate 2 in the display device 1 of FIG. 1 illustrates a portion corresponding to a region R in the display device 1 of FIG. 2.

As illustrated in FIG. 1, the display device 1 includes a light guide plate 2, a first light source 4 and a second light source 5 (corresponding to a plurality of light sources in the claims) arranged in a line along one end face of the light guide plate 2 parallel to a horizontal direction (X-axis in FIG. 1), and a light source controller 3.

Each of the first light source 4 and the second light source 5 constitutes a part of a light source group 15 including a plurality of light sources 14 illustrated in FIG. 2, and applies light inward from the one end face of the light guide plate 2. Examples of the first light source 4 and the second light source 5 include LEDs. Each of the first light source 4 and the second light source 5 may be capable of adjusting the light amount of the emitted light and may be capable of adjusting the color of the emitted light. Further, the distance between the first light source 4 and the second light source 5 (corresponding to an adjacent light source among the plurality of light sources in the claims) is preferably 5 mm or longer.

The light guide plate 2 is formed of a light transmissive housing and has emission structures 6 to 13 inside the housing. The light guide plate 2 guides light incident from each of the first light source 4 and the second light source 5 with the emission structures 6 to 13, and emits a part of the light from the light exit surface (the surface parallel to an XY plane in a positive direction of a Z-axis in FIG. 1). Examples of the emission structures 6 to 13 include prisms and mirrors. Details of the emission structures 6 to 13 will be described later.

The light source controller 3 (corresponding to the light amount adjuster and the color adjuster in the claims) controls turning-on and turning-off of each of the first light source 4 and the second light source 5 so that a symbol displayed on the light exit surface by the light emitted from each of the emission structures 6 to 13 appears to an observer to be moving. When the light amount of the light emitted by each of the first light source 4 and the second light source 5 is adjustable, the light source controller 3 may be configured to adjust each of the light amount of the light emitted by the first light source 4 and the light amount of the light emitted by the second light source 5. When the color of the light emitted by each of the first light source 4 and the second light source 5 is adjustable, the light source controller 3 may be configured to adjust each of the color of the light emitted by the first light source 4 and the color of the light emitted by the second light source 5.

Configuration of Emission Structure

Figure 3:
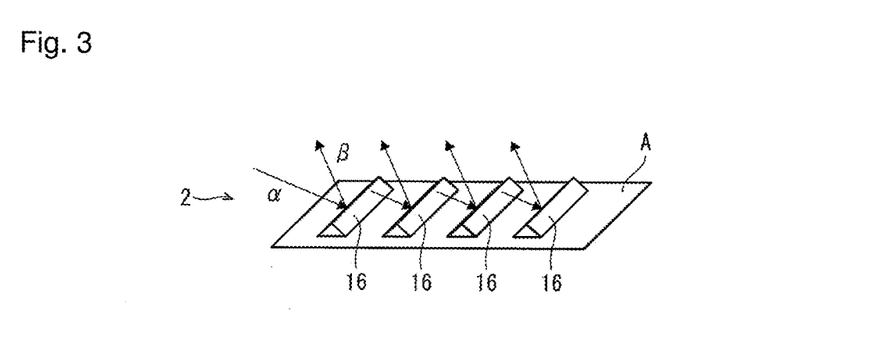
FIG. 3 is a perspective view of an emission structure provided in a display device according to the embodiment of the present invention.

Hereinafter, the functions of the emission structures 6 to 13 will be described in detail with reference to FIG. 3. FIG. 3 is a perspective view illustrating an outline of a configuration of a plurality of emission structures 16 (included in a first emission structure region A illustrated in FIG. 1) having a similar configuration as those of the emission structures 6 to 13. As illustrated in FIG. 3, each of the plurality of emission structures 16 has a convex shape toward the light exit surface of the light guide plate 2. Each of the plurality of emission structures 16 is configured such that the direction of light with the maximum intensity among light to be emitted is the same direction of an arrow β. Hence the direction of the light (arrow α) incident on each of the plurality of emission structures 16 is changed so that the direction of the light with the maximum intensity among the light to be emitted is the same direction of the arrow β. As a result, from each of the plurality of emission structures 16, the light with the maximum light intensity is emitted in the same direction of the arrow β. Since each of the plurality of emission structures 16 is formed in a band shape, streaky light corresponding to the band shape is emitted from each of the plurality of emission structures 16.

Next, the emission structures 6 to 13 illustrated in FIG. 1 will be described in detail. As illustrated in FIG. 1, the emission structure 6 and the emission structure 8 (corresponding to the first emission structure in the claims) are each disposed along a first emission structure region A. In addition, the emission structure 6 and the emission structure 8 are configured such that the incident direction for maximizing the amount of light emitted in the Z-axis positive direction (predetermined direction) in FIG. 1 is the direction of the first light source 4 (a direction of an arrow extending from the emission structure 6 to a position $X_n$, and a direction of an arrow extending from the emission structure 8 to the position $X_n$ in FIG. 1). As a result, the light emitted from each of the emission structure 6 and the emission structure 8 included in the first emission structure region A generates a first light emitting region A' on the light exit surface illustrated in FIG. 2.

Meanwhile, as illustrated in FIG. 1, the emission structure 9 and the emission structure 10 (corresponding to the second emission structure in the claims) are each disposed along a second emission structure region B. In addition, the emission structure 9 and the emission structure 10 are configured such that the incident direction for maximizing the amount of light emitted in the Z-axis positive direction (predetermined direction) in FIG. 1 is the direction of the second light source 5 (a direction of an arrow extending from the emission structure 9 to a position $X_{n+1}$ and a direction of an arrow extending from the emission structure 10 to the position $X_{n+1}$ in FIG. 1). As a result, the light emitted from each of the emission structure 9 and the emission structure 10 included in the second emission structure region B generates a second light emitting region B' on the light exit surface illustrated in FIG. 2.

Note that placement of the emission structure 6 and the emission structure 8 included in the first emission structure region A, placement of the emission structure 9 and the emission structure 10 included in the second emission structure region B, and the light amounts of the first light source 4 and the second light source are adjusted so that the first light emitting region A' and the second light emitting region B' on the light exit surface are circular symbols having similar shapes with different radiuses. Thereby, when the light sources are controlled so as to turn on the first light emitting region A' and the second light emitting region B' sequentially, the symbol displayed on the light exit surface appears to the observer to be moving or changing in size.

Further, as illustrated in FIG. 1, the emission structure 11, the emission structure 12, and the emission structure 13 (corresponding to the third emission structure in the claims) are each disposed in a region (the third emission structure region) between the first emission structure region A and the second emission structure region B. In addition, the emission structure 11, the emission structure 12, and the emission structure 13 are configured such that the incident direction for maximizing the amount of light emitted in the Z-axis positive direction (predetermined direction) in FIG. 1 is a direction between the first light source 4 and the second light source 5 (a direction of an arrow extending from the emission structure 11 to a position $X_4$, a direction of an arrow extending from the emission structure 12 to the position $X_2$, and a direction of an arrow extending from the emission structure 13 to a position $X_3$ in FIG. 1).

Note that the emission structure 7 is disposed in a region between the first emission structure region A and another emission structure region, not illustrated, similarly to the emission structure 11, the emission structure 12, and the emission structure 13. In addition, the emission structure 7 is disposed so that the incident direction for maximizing the amount of light emitted in the Z-axis positive direction (predetermined direction) in FIG. 1 is a direction between the first light source 4 and another light source, not illustrated (a direction of an arrow extending from the emission structure 7 to a position $X_1$ in FIG. 1).

With the above configuration of the emission structures 6 to 13, it appears to the observer that the light emitted from each of the emission structure 11, the emission structure 12, and the emission structure 13 included in the third emission structure region complements the boundary between the first light emitting region A' and the second light emitting region B' on the light exit surface illustrated in FIG. 2. That is, for example, when control is performed so as to turn on the second light source 5 after turning on the first light source 4, it is possible to achieve display performance in which the light smoothly moves from the first light emitting region A' to the second light emitting region B'. In addition, for example, even when the viewpoint of the observer moves while the first light source 4 and the second light source 5 are on, it is possible to achieve the display performance in which the light smoothly moves from the first light emitting region A' to the second light emitting region B'.

Further, as described above, since the first light source 4 and the second light source 5 are arranged in a line along one end face of the light guide plate 2 which is parallel to the horizontal direction (X-axis in FIG. 1), for example, when the viewpoint of the observer moves in the horizontal direction while the first light source 4 and the second light source 5 are on, it is possible to achieve performance in which the state of the symbol displayed on the light exit surface changes.

Further, in the display device 1 according to the present embodiment, the scope of one embodiment of the present invention also includes a configuration adopting a plurality of light sources having similar configurations to those of the first light source 4 and the second light source 5 and a plurality of emission structures having similar configurations to those of the emission structures 6 to 13. In this configuration as well, when each light source and each emission structure are configured so as to display a specific symbol by light emitted from each emission structure region and the lighting and extinction of each light source is controlled so that the symbol moves, the displayed symbol appears to the observer to be moving continuously.

Further, also in a case where the light amount of the light emitted by each of the first light source 4 and the second light source 5 is adjustable and the light source controller 3 is configured to adjust each of the light amount of the light emitted by the first light source 4 and the light amount of the light emitted by the second light source 5, it is possible to exert a similar effect to the effect by the third emission structure region described above. That is, since the light emitted from the third emission structure region complements the boundary between the first light emitting region A' and the second light emitting region B', when the light source controller 3 performs control so as to gradually increase the light amount of the first light source 4 and then gradually increase the light amount of the second light source 5, it is possible to achieve display performance in which the light moves more smoothly from the first light emitting region A' to the second light emitting region B'.

Further, also in a case where the color of the light emitted by each of the first light source 4 and the second light source 5 is adjustable and the light source controller 3 is configured to adjust each of the color of the light emitted by the first light source 4 and the color of the light emitted by the second light source 5, it is possible to exert a similar effect to the effect by the third emission structure region described above. That is, since the light emitted from the third emission structure region complements the boundary between the first light emitting region A' and the second light emitting region B', when the light source controller 3 performs control so as to gradually change the color of the first light source 4 to a specific color and then gradually change the color of the second light source 5 to the specific color, it is possible to achieve display performance in which the color more smoothly changes from the first light emitting region A' to the second light emitting region B'.

Hereinafter, the emission structure 11, the emission structure 12, and the emission structure 13 included in the third emission structure region will be described in more detail. The emission structure 11, the emission structure 12, and the emission structure 13 are configured such that, as the disposed position of each of the emission structures gets closer to the second emission structure region B from the first emission structure region A, the incident direction for maximizing the amount of light emitted in the Z-axis positive direction of FIG. 1 is a direction closer to the second light source 5 from the first light source 4.

Therefore, among the emission structure 11, the emission structure 12, and the emission structure 13, the emission structure 12 disposed at the farthest position from the second emission structure region B is configured such that the incident direction for maximizing the amount of emitted light is the direction farthest from the second light source 5 (the direction of an arrow extending from the emission structure 12 to the position $X_2$ in FIG. 1). Further, among the emission structure 11, the emission structure 12, and the emission structure 13, the emission structure 11 disposed at the closest position to the second emission structure region B is configured such that the incident direction for maximizing the amount of emitted light is the direction closest tp the second light source 5 (the direction of an arrow extending from the emission structure 11 to the position $X_4$ in FIG. 1). When the light amount of the first light source 4 and the light amount of the second light source 5 are the same, as the disposed position of each of the emission structure 11, the emission structure 12, and the emission structure 13 gets closer to the second emission structure region B, the amount of light emitted by each of the emission structures increases.

With the above configuration of the emission structure 11, the emission structure 12, and the emission structure 13, the light intensity in a third light emitting region on the light exit surface, generated by light emitted from each of the emission structure 11, the emission structure 12, and the emission structure 13, continuously increases from the first light emitting region A' to the second light emitting region B' on the light exit surface. Thus, for example, when control is performed so as to turn on the second light source 5 after turning on the first light source 4, it is possible to achieve the display performance in which the light moves more smoothly from the first light emitting region A' to the second light emitting region B'. In addition, for example, even when the viewpoint of the observer moves while the first light source 4 and the second light source 5 are on, it is possible to achieve the display performance in which light moves more smoothly from the first light emitting region A' to the second light emitting region B'.

Hereinafter, the above configuration of the emission structure 11, the emission structure 12, and the emission structure 13 included in the third emission structure region will be described in more detail. The emission structure 11, the emission structure 12, and the emission structure 13 are configured such that, as the disposed position of each of the emission structures gets closer to the second emission structure region B from the first emission structure region A, the direction for maximizing the amount of light emitted from the first light source 4 continuously changes from the direction for maximizing the amount of light emitted from the first emission structure region A to the direction for maximizing the amount of light emitted from the second emission structure region B, the light being emitted from the first light source 4.

Therefore, among the emission structure 11, the emission structure 12, and the emission structure 13, the emission structure 12 disposed at the farthest position from the second emission structure region B is configured such that the direction for maximizing the amount of light emitted from the first light source 4 is the direction closest to the direction for maximizing the amount of light emitted from the first emission structure region A (e.g., Z-axis positive direction). Further, among the emission structure 11, the emission structure 12, and the emission structure 13, the emission structure 11 disposed at the closest position to the second emission structure region B is configured such that the direction for maximizing the amount of light emitted from the first light source 4 is the direction closest to the direction for maximizing the amount of light emitted from the second emission structure region B, the light being emitted from the first light source 4 (e.g., Z-axis positive direction). The remaining emission structure 13 is configured such that the direction for maximizing the amount of light emitted from the first light source 4 is the direction between the direction for maximizing the amount of light emitted from the first light source 4 and from the emission structure 11 and the direction for maximizing the amount of light emitted from the emission structure 12, the light being emitted from the first light source 4.

With the above configuration of the emission structure 11, the emission structure 12, and the emission structure 13, the third light emitting region on the light exit surface, generated by light emitted from each of the emission structure 11, the emission structure 12, and the emission structure 13, complements the boundary between the first light emitting region A' and the second light emitting region B' so that there is no clearance therebetween. Thus, for example, when control is performed so as to turn on the second light source 5 after turning on the first light source 4, it is possible to achieve the display performance in which the light moves more smoothly from the first light emitting region A' to the second light emitting region B'. In addition, for example, even when the viewpoint of the observer moves while the first light source 4 and the second light source 5 are on, it is possible to achieve the display performance in which light moves more smoothly from the first light emitting region A' to the second light emitting region B'.

Further, the emission structure 11, the emission structure 12, and the emission structure 13 are configured such that the incident direction for maximizing the amount of emitted light is a direction from the installed position to a position indicated by the following formula (I) corresponding to the emission intensity on the light exit surface:

$$X_n + k \times (X_{n+1} - X_n) \times ((1-\alpha), 0) \quad \text{Formula (I)},$$

In Formula (I), as illustrated in FIG. 1, $X_n$ is an X-coordinate of a position at which the first light source 4 is installed, $X_{n+1}$ is an X-coordinate of a position at which the second light source 5 is installed. Further, $\alpha$ is the emission intensity (relative value) on the light exit surface when only the first light source 4 at the position $X_n$ is turned on, and satisfies $0 \leq \alpha \leq 1$. k is an arbitrary coefficient greater than 0, and may be a function $f(\alpha)$ of $\alpha$ instead of k.

By installing the emission structure 11, the emission structure 12, and the emission structure 13 in accordance with the above formula (I), it is possible to continuously change the emission intensity of the third light emitting region from the first light emitting region A' to the second light emitting region B' on the light exit surface.

Another Configuration of Display Device 1

Figure 4:
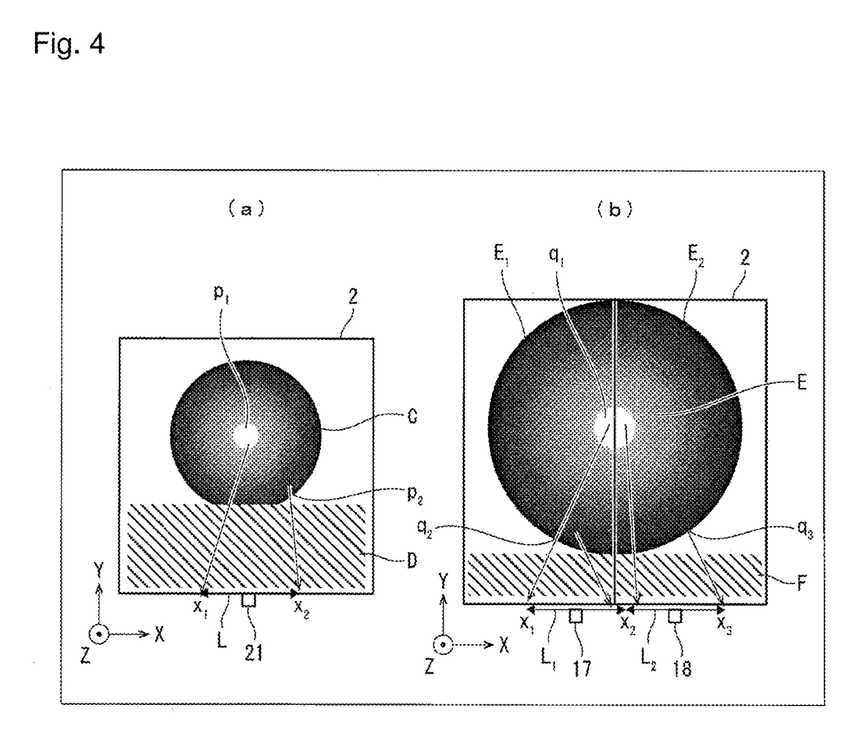
FIG. 4(a) is a schematic view illustrating a configuration of a light guide plate and a light source in a conventional technique.
FIG. 4(b) is a schematic view illustrating a configuration of a light guide plate, a first light source, and a second light source according to the embodiment of the present invention.

Hereinafter, another configuration of the display device 1 according to the present embodiment will be described with reference to FIGS. 4(*a*) and 4(*b*). FIG. 4(*a*) is a schematic view illustrating the configuration of the light guide plate 2 showing an example of the arrangement range of the light source. FIG. 4(*b*) is a schematic view illustrating the configuration of the light guide plate 2 showing another example of the arrangement range of the light source.

As illustrated in FIG. 4(*a*), the light guide plate 2 includes an emission structure region C therein. A plurality of light sources are installed on one end face of the light guide plate 2 along a range of an arrow L. A light source 21 is a light source that is on among the plurality of light sources, and emits light toward the emission structure region C inside the light guide plate 2. In the emission structure region C, a plurality of emission structures (not illustrated) are disposed so as to form a pattern in which a plurality of concentric circles having different radii are disposed from the center to the outermost circumference. The emission structure region C guides the light incident from the light source 21 by the plurality of emission structures and emits a part of the light from the light exit surface (the surface parallel to the XY plane in the Z-axis positive direction) to display a concentric circular symbol corresponding to the light source 21 on the light exit surface. Then, a light source controller (not illustrated) of the light source 21 sequentially turns on one of the plurality of light sources installed along the range of the arrow L from the light source at the position $X_1$ to the light source at the position $X_2$. Thereby, on the light exit surface, concentric circular symbols sequentially emit light from a center $p_1$ to the outermost circumference including the position $p_2$. Note that an arrow extending from the position $p_1$ to the position $X_1$ indicates the incident direction for maximizing the amount of emitted light in the emission structure disposed at the position $p_1$, and an arrow extending from the position $p_2$ to the position $X_2$ indicates the incident direction for maximizing the amount of emitted light in the emission structure disposed at the position $p_2$.

In the light guide plate 2 and the light source 21 having the configuration as described above, the range of concentric circular symbols on the light exit surface based on the pattern formed by the emission structures disposed in the emission structure region C is limited to the outermost circumference including the position $p_2$ since the range of the corresponding light source is limited to the range of the arrow L. In more detail, since the light source installed at the position $X_2$ has some degree of directivity, the emission structures on circles having larger radii than the circle including the position $p_2$ include the emission structure that sufficient light does not reach. Hence there is a possibility that a pattern of a circle in which the emission structure is disposed in the region D cannot properly emit light. Therefore, by forming a configuration described below, the above problem can be solved.

As illustrated in FIG. 4(*b*), the light guide plate 2 includes an emission structure region E on the inside. In addition, a plurality of light sources are installed along the range of an arrow $L_1$ on one end face of the light guide plate 2, and a light source 17 is a light source that is on among the plurality of light sources, and emits light toward an emission structure region $E_1$ formed by equally dividing the emission structure region E. Similarly, a light source 18 is a light source that is on among the plurality of light sources, and emits light toward the emission structure region $E_2$ formed by equally dividing the emission structure region E.

In the emission structure region $E_1$, a plurality of emission structures (not illustrated) are disposed so as to form a pattern in which a plurality of concentric semicircles having different radii are disposed from the center to the outermost circumference. The emission structure region $E_1$ guides the light incident from the light source 17 by the plurality of emission structures and emits a part of the light from the light exit surface (the surface parallel to the XY plane in the Z-axis positive direction) to display a concentric semicircular symbol corresponding to the light source 17 on the light exit surface.

Similarly, in the emission structure region $E_2$, a plurality of emission structures (not illustrated) are disposed so as to form a pattern in which a plurality of concentric semicircles having different radii are disposed from the center to the outermost circumference. The emission structure region E2 guides the light incident from the light source 18 by the plurality of emission structures and emits a part of the light from the light exit surface (the surface parallel to the XY plane in the Z-axis positive direction) to display a concentric semicircular symbol corresponding to the light source 18 on the light exit surface.

Then, a light source controller (not illustrated) of the light source 17 sequentially turns on one of the plurality of light sources installed along the range of the arrow $L_1$ from the light source at the position $X_1$ to the light source at the position $X_2$. At the same time, a light source controller (not illustrated) of the light source 18 sequentially turns on one of the plurality of light sources installed along the range of the arrow $L_2$ from the light source at the position $X_2$ to the light source at the position $X_3$. Consequently, concentric circular symbols each formed by combining the two semicircles corresponding to the light source 17 and the light source 18 on the light exit surface sequentially emit light from a center $q_1$ to the outermost circumference including the position $q_2$ and the position $q_3$. Note that an arrow extending from the position $q_1$ to the position $X_1$ indicates the incident direction for maximizing the amount of emitted light in the emission structure disposed at the position $q_1$, and an arrow extending from the position $q_2$ to the position $X_2$ indicates the incident direction for maximizing the amount of emitted light in the emission structure disposed at the position $q_2$. Further, an arrow extending from the position $q_1$ to the position X2 indicates the incident direction for maximizing the amount of emitted light in the emission structure disposed at the position q1, and an arrow extending from the position q3 to the position X3 indicates the incident direction for maximizing the amount of emitted light in the emission structure disposed at the position q3.

In the light guide plate 2, the light source 17, and the light source 18 according to the present embodiment having the configuration as described above, as compared with the prior art described above, the range of concentric circular symbol on the light exit surface based on the pattern formed by the emission structure disposed in the emission structure region E extends to the outermost circumference including the position $q_2$ and the position $q_3$ because the range of the corresponding light source extends to the range obtained by adding the range of the arrow $L_1$ and the range of the arrow $L_2$. More specifically, even when the light source installed at the position $X_1$ and the light source disposed at the position $X_3$ have directivities, since the regions irradiated with light by these light sources are made different from each other, it is possible to widen the region that can be irradiated with light by turning on these two light sources at the same timing. As a result, a region where the light cannot be guided even when the emission structure is provided narrows from the region D to the region F. Therefore, with the configuration of FIG. 4(b), the symbol can be displayed in a wider range on the light exit surface than the configuration of FIG. 4(a).

Modified Examples

Figure 5:
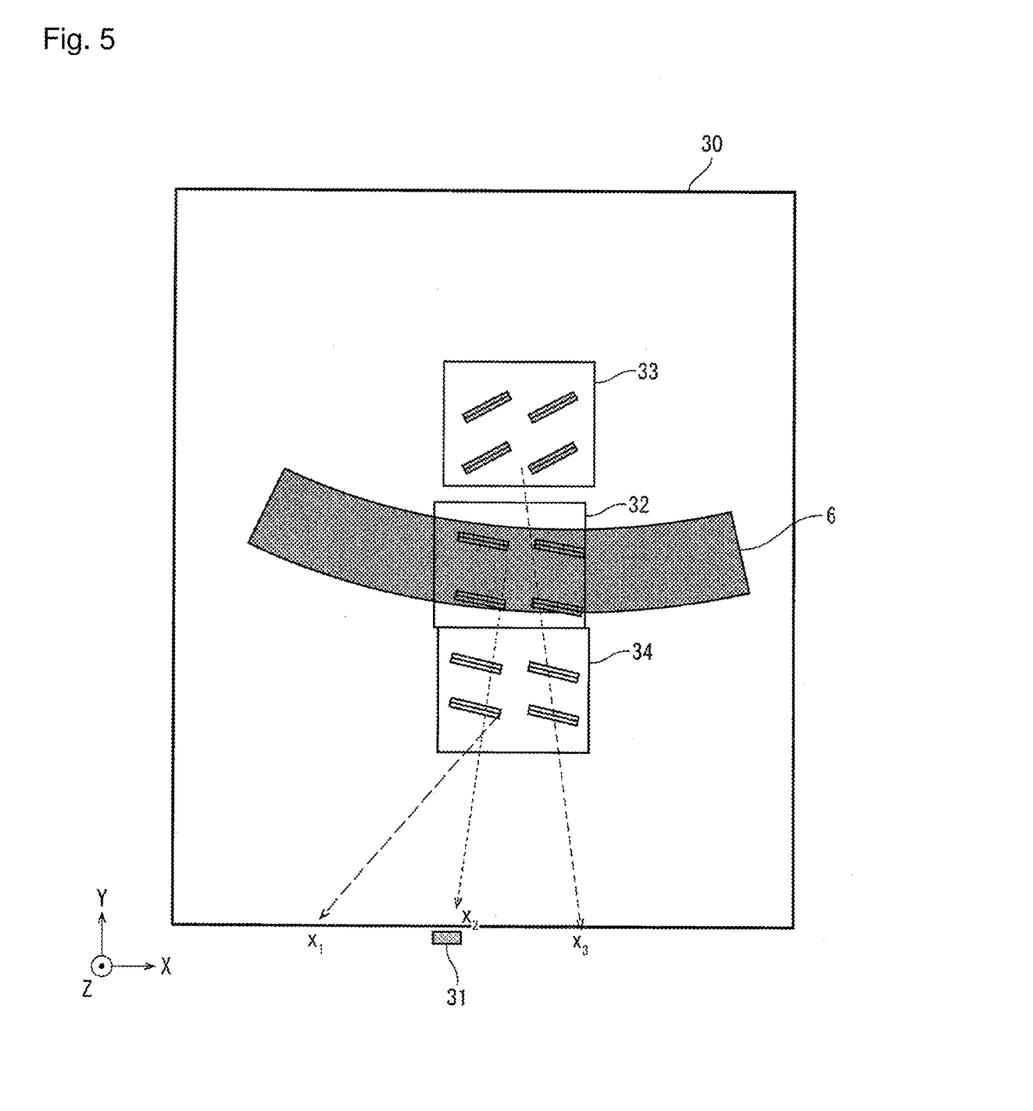
FIG. 5 is a schematic view illustrating a configuration of a light guide plate and a light source according to a modified example of the embodiment of the present invention.

Hereinafter, a light guide plate 30 and a light source 31, which are modifications of the present embodiment, will be described with reference to FIG. 5. FIG. 5 is a schematic view illustrating configurations of a light guide plate 30 and a light source 31 which are modifications of the present embodiment. As illustrated in FIG. 5, the light guide plate 30 includes an emission structure group 32 including a plurality of emission structures, an emission structure group 33, and an emission structure group 34.

The emission structure group 32 is included in the emission structure region G corresponding to the first emission structure region A or the second emission structure region B described above. In each emission structure included in an emission structure group 32, the incident direction for maximizing the amount of light emitted in the Z-axis positive direction in FIG. 5 is a direction of a light source 31 (a direction of an arrow extending from the emission structure group 32 to a position $X_2$ in FIG. 5).

In addition, each of the emission structure group 33 and the emission structure group 34 is included in a separate emission structure region corresponding to the above-described third emission structure region. That is, the light guide plate 30 according to this modification has a plurality of emission structure regions corresponding to the third emission structure region.

In each of a plurality of emission structures included in an emission structure group 33, the incident direction for maximizing the amount of light emitted in the Z-axis positive direction in FIG. 5 is the same direction of a position $X_3$ (a direction of an arrow extending from the emission structure group 33 to a position $X_3$ in FIG. 5).

In each of a plurality of emission structures included in an emission structure group 34, the incident direction for maximizing the amount of light emitted in the Z-axis positive direction in FIG. 5 is the same direction of a position $X_1$ (a direction of an arrow extending from the emission structure group 34 to a position $X_1$ in FIG. 5).

As described above, by adopting the configuration where the emission structure region corresponding to the third emission structure region include a plurality of emission structures (corresponding to the plurality of third emission structures in the claims) in which the same direction is set as the incident direction for maximizing the amount of emitted light, it is possible to pattern the plurality of emission structures having a similar configurations in each region at once, and thereby to improve the processing efficiency of the light guide plate 30.

The present invention is not limited to each of the embodiments described above, but can be subjected to various changes in the scope shown in the claims. An embodiment obtained by appropriately combining technical units disclosed respectively in different embodiments is also included in the technical scope of the present invention.

SUMMARY

In order to solve the above problem, a display device according to one aspect of the present invention includes a plurality of light sources and a light guide plate configured to guide light incident from each of the light sources and emit a part of the guided light from a light exit surface. In the display device, the light guide plate includes a first emission structure region including a plurality of first emission structures in which an incident direction for maximizing an amount of light emitted in a predetermined direction is a direction of a first light source, a second emission structure region including a plurality of second emission structures in which the incident direction for maximizing the amount of light emitted in the predetermined direction is a direction of a second light source adjacent to the first light source, and a third emission structure region including a plurality of third emission structures in which the incident direction for maximizing the amount of light emitted in the predetermined direction is a direction between the first light source and the second light source. The third emission structure region is disposed between the first emission structure region and the second emission structure region.

With the above configuration, it appears to the observer that the light emitted from each of the plurality of third emission structures included in the third emission structure region complements the boundary between the first light emitting region generated by light emitted from the first emission structure region and the second light emitting region generated by light emitted from the second emission structure region on the light exit surface. That is, for example, when control is performed so as to turn on the second light source after turning on the first light source, it is possible to achieve display performance in which the light smoothly moves from the first light emitting region to the second light emitting region. In addition, for example, even when the viewpoint of the observer moves while the first light source and the second light source are on, it is possible to achieve the display performance in which the light smoothly moves from the first light emitting region to the second light emitting region.

In the display device according to one aspect of the present invention, as a position at which each of the plurality of third emission structures is disposed gets closer to the second emission structure region from the first emission structure region, the incident direction for maximizing the amount of light emitted in the predetermined direction may be a direction closer the second light source from to the first light source.

With the above configuration, the light intensity in the third light emitting region on the light exit surface, generated by light emitted from each of the plurality of third emission structures continuously increases from the first light emitting region to the second light emitting region on the light exit surface. Thus, for example, when control is performed so as to turn on the second light source after turning on the first light source, it is possible to achieve the display performance in which the light moves more smoothly from the first light emitting region to the second light emitting region. In addition, for example, even when the viewpoint of the observer moves while the first light source and the second light source are on, it is possible to achieve the display performance in which light moves more smoothly from the first light emitting region to the second light emitting region.

In the display device according to one aspect of the present invention, as the position at which each of the plurality of third emission structures is disposed gets closer to the second emission structure region from the first emission structure region, a direction for maximizing the amount of light emitted from the first light source may continuously change from a direction for maximizing the amount of light emitted from the first emission structure region to a direction for maximizing the amount of light emitted from the second emission structure region, the light being emitted from the first light source.

With the above configuration, the third light emitting region on the light exit surface, generated by each of the plurality of third emission structures, complements the boundary between the first light emitting region and the second light emitting region B so that there is no clearance therebetween. Thus, for example, when control is performed so as to turn on the second light source after turning on the first light source, it is possible to achieve the display performance in which the light moves more smoothly from the first light emitting region to the second light emitting region. In addition, for example, even when the viewpoint of the observer moves while the first light source and the second light source are on, it is possible to achieve the display performance in which light moves more smoothly from the first light emitting region to the second light emitting region.

In the display device according to one aspect of the present invention, the third emission structure region is made up of one or more regions, and each of the one or more regions includes the plurality of third emission structures in which the same direction is set as an incident direction for maximizing the amount of emitted light.

With the above configuration, it is possible to pattern a plurality of third emission structures having the same configuration in each region at once, so that the processing efficiency of the light guide plate can be improved.

In the display device according to one aspect of the present invention, each of the plurality of third emission structures may be configured such that an incident direction for maximizing the amount of emitted light is from an installed position to a position indicated by the following formula (I) corresponding to emission intensity on the light exit surface:

$$X_n + k \times (X_{n+1} - X_n) \times ((1-\alpha), 0) \qquad \text{Formula (I)},$$

where $X_n$ is a position at which the first light source is installed, $X_{n+1}$ is a position at which the second light source is installed, $\alpha$ is an emission intensity (relative value) on the light exit surface when only the first light source is turned on, and satisfies $0 \leq \alpha \leq 1$, and k is an arbitrary coefficient greater than 0. With the above configuration, by setting each of the plurality of third emission structures in accordance with the formula (I), the emission intensity of the third light emitting region can be continuously changed on the light exit surface from the first light emitting region to the second light emitting region.

In the display device according to one aspect of the present invention, a light amount of each of the plurality of light sources, placement of each of the plurality of first emission structures, and placement of each of the plurality of second emission structures may be adjusted so that a first light emitting region on the light exit surface, generated by light emitted from the first emission structure region, and a second light emitting region on the light exit surface, generated by light emitted from the second emission structure region, have similar shapes.

With the above configuration, when the light sources are controlled so as to turn on the first light emitting region and the second light emitting region sequentially, the symbol displayed on the light exit surface appears to the observer to be moving or changing in size.

In the display device according to one aspect of the present invention, the plurality of light sources may be arranged in a line in a horizontal direction.

With the above configuration, when the viewpoint of the observer moves in the horizontal direction while the first light source and the second light source are on, it is possible to achieve performance in which the state of the symbol displayed on the light exit surface changes.

In the display device according to one aspect of the present invention, a distance between adjacent light sources out of the plurality of light sources may be 5 mm or longer.

In the display device according to one aspect of the present invention, each of the first light source and the second light source may be able to adjust a light amount of the emitted light, and the display device may further include a light amount adjuster configured to adjust each of the light amount of light emitted by the first light source and the light amount of light emitted by the second light source.

With the above configuration, when the light source controller performs control so as to gradually increase the light amount of the first light source and then gradually increase the light amount of the second light source, it is possible to achieve display performance in which the light moves more smoothly from the first light emitting region to the second light emitting region.

In the display device according to one aspect of the present invention, each of the first light source and the second light source may be able to adjust the color of the emitted light, and the display device may further include a color adjuster configured to adjust each of the color of the light emitted by the first light source and the color of the light emitted by the second light source.

With the above configuration, when the light source controller performs control so as to gradually change the color of the first light source to a specific color and then gradually change the color of the second light source to the specific color, it is possible to achieve display performance in which the color more smoothly changes from the first light emitting region to the second light emitting region.

DESCRIPTION OF SYMBOLS 1 display device
2, 30 light guide plate
3 light source controller
4 first light source
5 second light source
6, 7, 8, 9, 10, 11, 12, 13, 16 emission structure
15 light source group
32, 33, 34 emission structure group

The invention claimed is:
1. A display device comprising:
a plurality of light sources; and
a light guide plate configured to guide light incident from each of the light sources and emit a part of the guided light from a light exit surface,
wherein the light guide plate includes
a first emission structure region including a plurality of first emission structures in which an incident direction for maximizing an amount of light emitted in a predetermined direction is a direction of a first light source,
a second emission structure region including a plurality of second emission structures in which the incident direction for maximizing the amount of light emitted in the predetermined direction is a direction of a second light source adjacent to the first light source, and
a third emission structure region including a plurality of third emission structures in which the incident direction for maximizing the amount of light emitted in the predetermined direction is a direction between the first light source and the second light source,
wherein, as a position at which each of the plurality of third emission structures is disposed gets closer to the second emission structure region from the first emission structure region, the incident direction for maximizing the amount of light emitted in the predetermined direction is a direction closer the second light source from to the first light source, and
a controller configured to turn on the first light source and the second light source sequentially, and
the third emission structure region is disposed between the first emission structure region and the second emission structure region.

2. The display device according to claim 1, wherein, as the position at which each of the plurality of third emission structures is disposed gets closer to the second emission structure region from the first emission structure region, a direction for maximizing the amount of light emitted with the light from the first light source continuously changes from a direction for maximizing the amount of light emitted from the first emission structure region to a direction for maximizing the amount of light emitted from the second emission structure region with the light from the first light source.

3. The display device according to claim 1, wherein
the third emission structure region is made up of one or more regions, and
each of the one or more regions includes the plurality of third emission structures in which the same direction is set as an incident direction for maximizing the amount of emitted light.

4. The display device according to claim 1, wherein each of the plurality of third emission structures is configured such that an incident direction for maximizing the amount of emitted light is from an installed position to a position indicated by the following formula (I) corresponding to emission intensity on the light exit surface:

$$X_n + k \times (X_{n+1} - X_n) \times ((1-\alpha), 0) \qquad \text{Formula (I)},$$

where $X_n$ is a position at which the first light source is installed, $X_{n+1}$ is a position at which the second light source is installed, a is an emission intensity (relative value) on the light exit surface when only the first light source is turned on, and satisfies $0 \leq \alpha \leq 1$, and k is an arbitrary coefficient greater than 0.

5. A display device comprising:
a plurality of light sources; and
a light guide plate configured to guide light incident from each of the light sources and emit a part of the guided light from a light exit surface,
wherein the light guide plate includes
a first emission structure region including a plurality of first emission structures in which an incident direction for maximizing an amount of light emitted in a predetermined direction is a direction of a first light source, a second emission structure region including a plurality of second emission structures in which the incident direction for maximizing the amount of light emitted in the predetermined direction is a direction of a second light source adjacent to the first light source, and a third emission structure region including a plurality of third emission structures in which the incident direction for maximizing the amount of light emitted in the predetermined direction is a direction between the first light source and the second light source, and wherein, as a position at which each of the plurality of third emission structures is disposed gets closer to the second emission structure region from the first emission structure region, the incident direction for maximizing the amount of light emitted in the predetermined direction is a direction closer the second light source from to the first light source, and wherein, a light amount of each of the plurality of light sources, placement of each of the plurality of first emission structures, and placement of each of the plurality of second emission structures are adjusted so that a first light emitting region on the light exit surface, generated by light emitted from the first emission structure region, and a second light emitting region on the light exit surface, generated by light emitted from the second emission structure region, have similar shapes.

6. The display device according to claim 1, wherein the plurality of light sources is arranged in a line in a horizontal direction.

7. The display device according to claim 1, wherein a distance between adjacent light sources out of the plurality of light sources is 5 mm or longer.

8. The display device according to claim 1, wherein
each of the first light source and the second light source is able to adjust a light amount of the emitted light, and
the display device further comprises a light amount adjuster configured to adjust each of the light amount of light emitted by the first light source and the light amount of light emitted by the second light source.

9. The display device according claim 1, wherein
each of the first light source and the second light source is able to adjust a color of the emitted light, and
the display device further comprises a color adjuster configured to adjust each of a color of the light emitted by the first light source and a color of the light emitted by the second light source.

* * * * *